United States Patent

[11] 3,630,579

| [72] | Inventor | Anton Rodi |
| | | Karlsruhe, Germany |
| [21] | Appl. No. | 854,462 |
| [22] | Filed | Sept. 2, 1969 |
| [45] | Patented | Dec. 28, 1971 |
| [73] | Assignee | Teldix GmbH |
| | | Heidelberg, Germany |
| [32] | Priority | Sept. 4, 1968 |
| [33] | | Germany |
| [31] | | P 17 80 348.4 |

[54] ANTILOCKING CONTROL SYSTEM
2 Claims, 2 Drawing Figs.

[52] U.S. Cl..................................... 303/21 BE,
  188/181 A, 303/20
[51] Int. Cl...................................... B60t 8/12
[50] Field of Search........................... 188/181 A;
  303/21, 20; 324/162; 340/262

[56] References Cited
UNITED STATES PATENTS

| 3,467,444 | 9/1969 | Leiber............ | 188/181 X A |
| 3,498,683 | 3/1970 | Leiber............ | 188/181 X A |
| 3,398,995 | 8/1968 | Martin............ | 303/21 BE |
| 3,542,437 | 11/1970 | Leiber et al..... | 303/21 B |

*Primary Examiner*—Trygve M. Blix
*Assistant Examiner*—Stephen G. Kunin
*Attorney*—Spencer & Kaye ABSTRACT: A vehicle brake antilocking control system which includes a normally open inlet valve allowing the brake fluid pressure developed at the master cylinder to be applied to the wheel brake system, and a normally closed outlet valve for reducing the brake fluid pressure at the wheel brake system. When the brakes are applied and a first threshold of wheel rotational deceleration is reached, the inlet valve is closed to maintain a constant brake fluid pressure at the wheel brake system. If this constant pressure is insufficient to attain a second threshold of wheel rotational deceleration, the inlet valve reopens as soon as the first threshold is no longer attained—as will occur incidental to slowing of the vehicle. If, however, the constant pressure is sufficient to attain the second deceleration threshold, the state of a bistable circuit controlling the outlet valve is changed. This change of state opens the outlet valve and one of a pair of diodes retains this state while the other of the pair of diodes retains the inlet valve closed even though the two thresholds are no longer attained by reason of the brake fluid pressure reduction. This condition will prevail until the bistable circuit is returned to its normal state in response to the attainment of a threshold of wheel rotational acceleration.

PATENTED DEC 28 1971 3,630,579
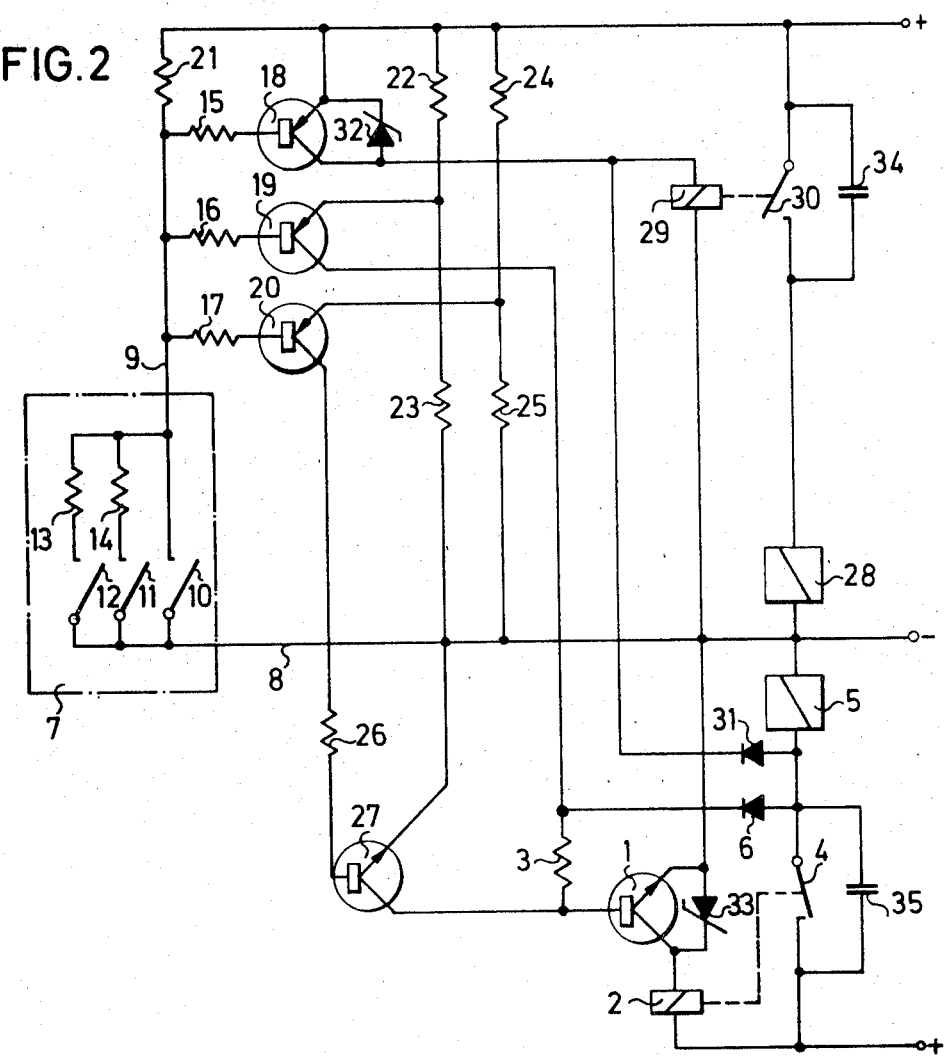
INVENTOR.
Anton Rodi
BY Spencer & Kaye
Attorneys

ANTILOCKING CONTROL SYSTEM

CROSS-REFERENCE TO RELATED APPLICATION AND BACKGROUND OF THE INVENTION

Copending application Ser. No. 835,646 filed June 23rd, 1969, now U.S. Pat. No. 3,589,777, of Heinz Leiber et al. and assigned to the same assignee as the present application discloses an antilocking control system for vehicle brakes in which a wheel rotational acceleration and deceleration sensor is associated with a logic circuit so as to cause the speed of the vehicle wheel, during brake application, to oscillate about some ideal value which will effect the most efficient braking action without allowing locking of the wheel and consequent skidding thereof.

SUMMARY OF THE INVENTION

The present invention relates to an antilocking control system generally as described in the aforesaid copending application and is directed in particular to a simple, yet efficient control system for attaining the desired braking action automatically.

In essence, the present invention is directed to a bistable circuit system operatively associated with the vehicle wheel sensor and with the control or actuator for the outlet valve for reducing the brake fluid pressure at the vehicle wheels after the inlet value has closed momentarily to maintain a constant brake fluid pressure at the vehicle wheels. The bistable circuit involves a transistor having an actuator for controlling the outlet valve connected across its collector-emitter path and wherein two switching paths are provided to control the base electrode of the transistor. One switching path is effected when the wheel rotational deceleration attains a predetermined threshold valve and renders the transistor conductive to open the outlet valve. This state of the bistable circuit is maintained by the use of a diode even though the switching path is opened due to the pressure reduction at the vehicle wheel and consequent acceleration allowed thereof. The normal state of the bistable circuit is returned through the use of a second switching path which is closed in response to the attainment of a predetermined rotational acceleration of the vehicle wheel.

A second diode may be provided to retain the inlet valve in closed condition until the bistable circuit is returned to its normal state.

BRIEF DESCRIPTION OF THE DRAWING FIGURES

FIG. 1 is a circuit diagram illustrating the principles of the present invention.

FIG. 2 is a circuit diagram illustrating both the inlet and outlet valve controls for the system.

DETAILED DESCRIPTION OF THE PREFERRED EMBODIMENTS

With reference to FIG. 1, a bistable circuit associated with the outlet valve actuator 5 of an antilocking control system for vehicle brakes is illustrated. As disclosed in the aforesaid copending application, the antilocking control system includes a normally open inlet valve and a normally closed outlet valve. The inlet valve allows the brake fluid pressure developed at the master brake cylinder to be applied to the vehicle wheel brakes and upon attainment of a predetermined rotational deceleration of a vehicle wheel, the inlet valve for that wheel is closed thereby to maintain a constant brake pressure at the vehicle wheel. If the brakes are applied with some predetermined pressure which will cause the first deceleration threshold to be attained, but not a second deceleration threshold, the constant pressure attained by closing the inlet valve will be insufficient to cause attainment of the second threshold and the slowing of the vehicle will produce a condition in which the first threshold is no longer attained and the inlet valve will reopen. If, however, the brakes are applied with sufficient severity as will cause both the first and second deceleration thresholds to be attained, the inlet valve will close upon attainment of the first threshold to maintain the constant pressure which will be sufficient to attain the second threshold whereupon the outlet valve will be opened to reduce the brake pressure at the vehicle wheel and thus allow the vehicle wheel to accelerate so that the first and second thresholds are no longer attained. It is desirable to retain both the inlet valve closed and the outlet valve open until the wheel rotational acceleration reaches some predetermined threshold value at which time the valves are returned to their normal states.

The system according to FIG. 1 is a bistable circuit system associated with the outlet valve actuator 5 as specified and is effective to maintain the outlet valve actuator 5 energized, and consequently the outlet valve open, until the predetermined rotational acceleration of the wheel is reached. For this purpose, the transistor 1 is provided and is connected so that the winding of the relay 2 is in the emitter-collector path of the transistor so that when the transistor conducts, the relay 2 will be energized to close its associated switch 4. Closing of the switch 4 will cause energization of the actuator 5. The conductive state of the transistor 1 is effected by means of a switch path *a* which connects the base electrode of the transistor 1 to the positive potential when the switch *a* is closed. The normal state of the bistable circuit is such that the transistor 1 is nonconducting.

As soon as the switch *a* is closed and the relay 2 energized to close the switch 4, the actuator 5 opens the outlet valve which will reduce the brake fluid pressure at the associated vehicle wheel. Thus, the switch path *a* which was closed in response to a predetermined threshold of vehicle rotational deceleration will not open and in order to maintain the conductive state of the transistor 1, the diode 6 is provided so as to maintain the base electrode of the transistor 1 at positive potential. The switching path *b* is responsive to attainment of a predetermined threshold of wheel rotational acceleration and, when this threshold is attained, the switching path *b* closes so as to connect the base electrode of the transistor 1 to negative potential, thus rendering the transistor nonconductive so as to deenergize the relay 2 and open the switch 4 to consequently deenergize the actuator 5 and allow the outlet valve to reclose.

The resistor 3 is provided to assure resetting the transistor to its nonconductive or normal state particularly if the switching paths are of such nature that the switching path *a* and the switching path *b* are closed at the same time.

The system as shown in FIG. 2 illustrates the control system both for the inlet and the outlet valve controlling the brake fluid pressure at the vehicle wheel. In FIG. 2, the actuator 28 controls the normally open inlet valve and, when energized, closes the inlet valve and the actuator 5, as in FIG. 1, controls the outlet valve and, when energized, opens the outlet valve. The vehicle wheel sensor is indicated by the reference character 7 and will be seen to include the three switches 10, 11 and 12 connected in common by the conductor 8 to negative potential whereas the corresponding contacts of these switches are connected by the common conductor 9 to positive potential through the dropping resistor 21. The switches 11 and 12 have resistors 14 and 13 respectively associated therewith, the purpose of which will be presently apparent.

The normally nonconducting transistor 18 is associated with the switch 12 and, as shown, has its emitter electrode connected to the source of positive potential while its collector electrode is connected to the relay 29 which controls the switch 30 which, when closed, connects the actuator 28 to energize same and close the normally open inlet valve. A Zener diode 32 is connected across the collector and emitter electrodes of the transistor 18 for protection purposes and a capacitor 34 is connected across the switch 30 to prevent arcing.

The base electrode of the transistor 18 is connected through a resistor 15 to the conductor 9 and the base electrodes of the transistors 19 and 20 are similarly connected through the resistors 16 and 17 respectively. The transistor 19 is adapted to be controlled by the switch 11 and its emitter is connected across the positive and negative terminals by means of the voltage divider resistor chain 22, 23 while the emitter of the transistor 21 is similarly connected through the medium of the voltage divider resistor chain 24, 25.

The sensor switch 12 is adapted to close upon attainment of a predetermined threshold of vehicle wheel rotational deceleration and, when closed, to render the transistor 18 conductive so as to energize the relay 29 and cause the inlet valve to be closed. The sensor switch 12 is effective to cause both the transistors 18 and 19 to be conductive and the latter of which biases the base electrode of the transistor 1 so as to cause it to become conductive and thereby energize the relay 2 to close the switch 4 and correspondingly to energize the actuator 5 causing the outlet valve to open. In FIG. 2, the transistor 1 is shown with a protective Zener diode 33 and the switch contact 4 with a protective capacitor 35. The sensor switch contact 10 is adapted to close when a predetermined threshold of vehicle wheel rotational acceleration is attained, thereby to cause the transistor 20 to conduct. It will be appreciated, of course, that the closing of the switch 10 also causes the transistors 18 and 19 to conduct so that even though the transistor 1 is biased to nonconducting condition, thereby to deenergize the relay 2 and the actuator 5 for the outlet valve, the relay 29 will remain energized until the switch 10 reopens. The entire cycle of operations, of course, occurs very rapidly and further cycles may occur sequentially.

If the brakes are applied with some predetermined pressure which will cause the first deceleration threshold to be attained, but not the second deceleration threshold, the switch 12 will close upon attainment of the first deceleration threshold and thereby close the inlet valve to hold the brake pressure at the stated predetermined pressure. Since this predetermined pressure can not cause such braking effort as will produce the second deceleration threshold, after a short time when the vehicle has slowed and the first threshold is therefore no longer exceeded, the switch 12 reopens and the inlet valve relay 29 will immediately be deenergized to allow the inlet valve to reopen also.

If, however, the brakes are applied with such force as will cause both the first and second deceleration thresholds to be attained, the switch 12 first closes to retain the corresponding relatively high brake pressure at the vehicle wheel and then the second threshold will be reached so that switch 11 closes to energize the relay 2 and close the switch 4 thereby to energize the actuator 5 and open the outlet valve. The brake pressure is thus reduced and the wheel will begin to accelerate after attaining the second deceleration threshold so that the switches 11 and 12 will both open. At this time, however, the inlet valve will not reopen because the relay 29 will remain energized due to the circuit established by the diode 31. Nor will the outlet valve reclose because the relay 2 will remain energized due to the circuit established by the diode 6.

Thus, once the second deceleration threshold is reached, the inlet valve will remain closed and the outlet valve will remain open until the acceleration of the wheel reaches some predetermined value at which time the switch 10 closes to place a negative bias at the base of the transistor 1 thereby to render it nonconductive so that the switch 4 is open.

Thus, it would be apparent that the switch $a$ of FIG. 1 corresponds to the switch 11 and transistor 19 of FIG. 2, and that the switch $b$ of FIG. 1 corresponds to the switch 10 and the transistors 20 and 27 of FIG. 2.

It should still be mentioned that the relays are preferably constructed in the form of the so-called protective-gas relays, which are available on the market in extremely small structural configurations. The current consumption of these relays is so low that the remaining circuit may be constructed according to the so-called integrated circuit technique. Consequently the entire circuit arrangement according to FIG. 2 can be realized in an extremely small space of the size of a matchbox or even smaller.

It will be understood that the above description of the present invention is susceptible to various modifications, changes and adaptations.

I claim:

1. In an antilocking control system for vehicle brake systems of the type including a normally open inlet valve for communicating master cylinder brake fluid pressure to a vehicle wheel, first actuator means for controlling said inlet valve, a normally closed outlet valve for reducing brake fluid pressure at the vehicle wheel, second actuator means for controlling said outlet valve, and wheel rotational speed responsive sensor means for controlling said inlet and outlet valves through said first and second actuator means, the improvement comprising:

a. a bistable circuit connected to said second actuator means, said bistable circuit having a normal nonconductive state, wherein said second actuator means allows said outlet valve to remain in its normal position, and conductive state which causes said second actuator means to be energized to open said outlet valve, said bistable circuit including
      1. a transistor having a base, an emitter and a collector,
      2. a relay having its windings connected in the emitter-collector path of said transistor and its normally open switch contacts connected in series with said second actuator means across said emitter-collector path of said transistor, and
      3. a diode connected between the base of said transistor and the common junction of said normally open switch contacts and said actuator means; and
   b. said sensor means including
      1. first switch means responsive to a first threshold of wheel rotational deceleration for energizing said first actuator means to close said inlet valve,
      2. second switch means responsive to a second threshold of wheel rotation deceleration and being connected to the base of said transistor for changing said bistable circuit from its normal state to its conductive state, and
      3. third switch means responsive to a threshold of wheel rotational acceleration and being connected to the base of said transistor for returning said bistable circuit to its normal state.

2. The combination defined in claim 1 further comprising a second diode connected between said common junction of said second actuator means and said normally open switch contacts and said first actuator means for maintaining said first actuator means energized while said second actuator means is energized.

* * * * *